May 24, 1955     F. P. PLOTKIN     2,709,113
WIRE WHEEL COVER
Filed Jan. 27, 1953                        2 Sheets-Sheet 1
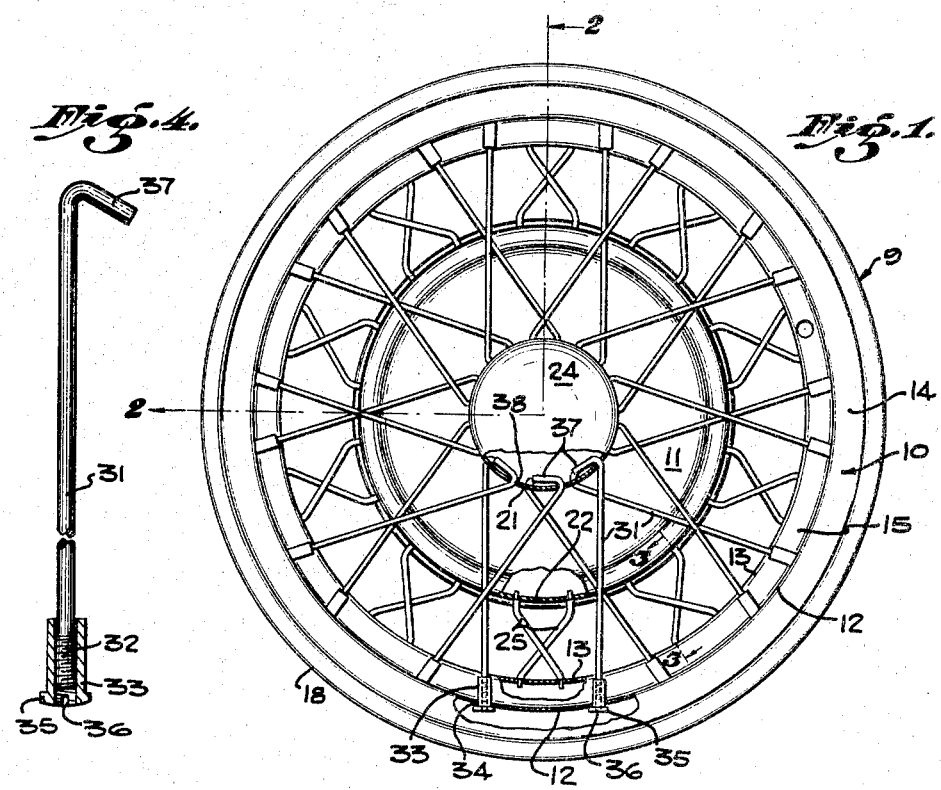
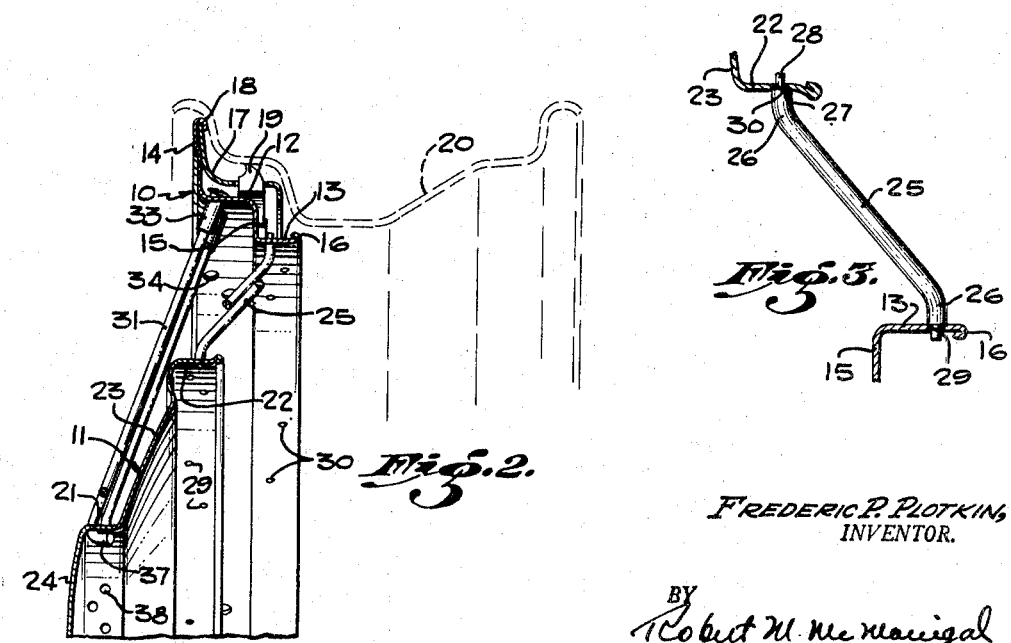
FREDERIC P. PLOTKIN,
INVENTOR.
BY
Robert M. McManigal
ATTORNEY May 24, 1955 F. P. PLOTKIN 2,709,113
WIRE WHEEL COVER
Filed Jan. 27, 1953 2 Sheets-Sheet 2
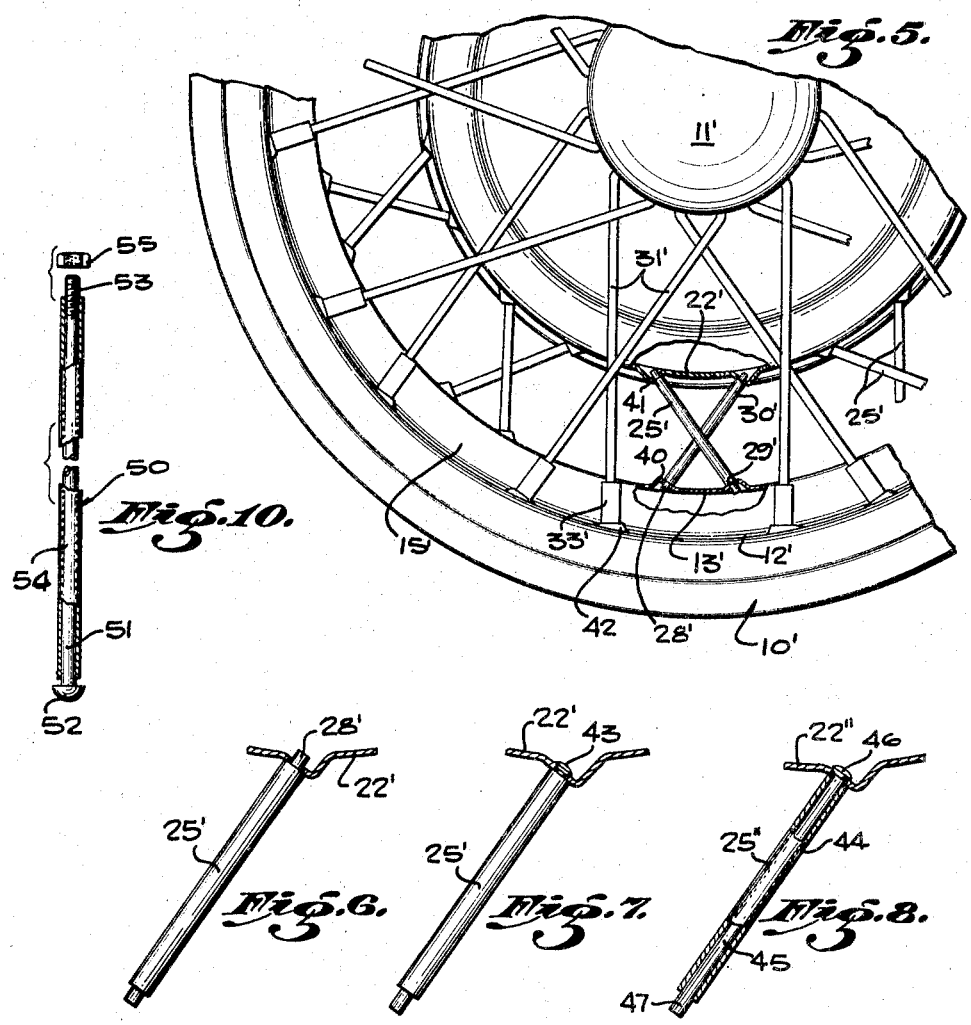
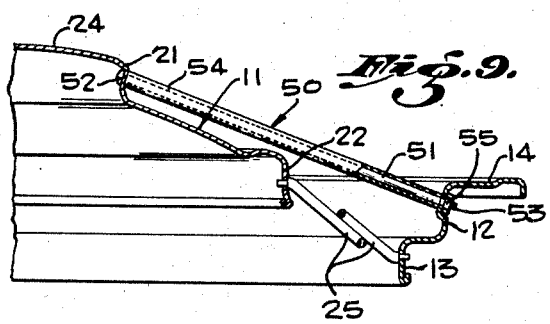
FREDERIC P. PLOTKIN,
INVENTOR.
BY
Robert M. McManigal
ATTORNEY United States Patent Office 2,709,113
Patented May 24, 1955

2,709,113

WIRE WHEEL COVER

Frederic P. Plotkin, Los Angeles, Calif.

Application January 27, 1953, Serial No. 333,425

1 Claim. (Cl. 301—37)

The present invention relates to a wheel cover and more particularly to such a cover that is adapted to be secured to the outer portion of a vehicle wheel rim in order to simulate a wire type wheel.

In order to add to the appearance of a vehicle, particularly an automobile, it has long been desirable to have spoked or wire type wheels thereon. These wheels are not only complex in construction but necessarily expensive therefore being prohibitive to the average automobile owner. Furthermore, in the interest of economy most automobiles currently in use have been constructed with solid type wheels and rims and a change over to wire type wheels would be impractical from an economic standpoint.

Accordingly, the present invention contemplates the provision of suitable wheel covers to replace the usual wheel disk or hub cap and to as closely as possible simulate the wire type wheel construction. Due to the vibration factors and centrifugal forces involved, it is necessary for such a device to be rigid in construction, relatively simple to manufacture and still be ornamental in appearance.

It is therefore an object of the present invention to provide a novel wheel cover of the character described that will simulate the appearance of a wire or spoke type wheel.

Another object of the present invention is to provide a novel means for supporting a central hub structure through the use of a particular arrangement of spokes, wires or the like.

A further object of the invention is to provide a novel wire wheel cover assembly that is relative simple in construction, reliable and sturdy in use and pleasantly ornamental in appearance.

My invention has many other objects, advantages, and features, some of which, with the foregoing, will be set forth in the following description in which I will describe certain embodiments of my invention which I have selected for illustrative purposes only in the drawing accompanying and forming a part of the present specification.

Fig. 1 is a front elevational view, partially in section, of the wheel cover of my invention;

Fig. 2 is a fragmentary sectional view taken substantially as indicated by line 2—2, Fig. 1;

Fig. 3 is a fragmentary sectional view of one of the primary spoke members and taken substantially as indicated by line 3—3, Fig. 1;

Fig. 4 is a detail elevational view of one of the secondary spoke members;

Fig. 5 is an enlarged fragmentary elevational view of a modified form of spoke arrangement and construction;

Fig. 6 is a fragmentary detail view of the primary spoke arrangement of Fig. 5;

Fig. 7 is a fragmentary detail view similar to Fig. 6 and showing a further modified form of primary spoke attachment means;

Fig. 8 is a still further modified arrangement of the primary spoke means;

Fig. 9 is a fragmentary sectional view showing a modified form of secondary spoke means; and Fig. 10 is an enlarged detail exploded view of the modified spoke means of Fig. 9.

Referring to the drawings by reference characters, the invention, as embodied in a wheel cover, is shown as indicated generally at 9. As shown in Figs. 1 and 2, the wheel cover includes an outer ring 10 and a centrally disposed hub 11. The outer ring 10 is formed as by spinning or the like and has axially spaced concentric portions 12 and 13 which are joined by radial portion 15. Radial portion 14 is secured to axially spaced portion 12. The inner axial end of the portion 13 is formed with a bead 16 for stiffening said member.

The wheel cover 9 may be secured to the wheel rim by any suitable means. For example, an annular wheel rim adapter 17 may be arranged about the ring 10 and secured thereto by means of a rolled bead 18 formed on the periphery of the portion 14 thereof. The adapter 17 carries a plurality of spring detents 19 which are adapted to engage a portion of a wheel rim indicated by the dotted lines at 20 to secure the wheel cover thereto.

The hub 11 comprises axially spaced concentric portions 21 and 22 which are joined by means of a substantially cone shaped portion 23, and a central portion 24. As shown primarily in Fig. 2, the hub 11 is axially spaced from the ring 10 so that the portions 21 and 22 are also axially spaced from the portions 12 and 13 of the ring 10, the purpose of which will be later described.

A plurality of primary spokes 25 are arranged in crossed pairs intermediate the portion 13 and the portion 22, these spokes being in compression therebetween. In order to provide for simple and rapid construction of the wheel cover and to insure a rigid construction thereof, the spokes 25 are preferably bent as at 26 so as to be arranged in alignment with the surface of the portions 13 and 22. Shoulders 27, formed adjacent the ends of the spokes 25, are adapted to engage the portions 13 and 22, there being integral reduced diameter pin portions 28 extending from the shoulders and adapted to be received in openings 29 and 30 in the portions 13 and 22 respectively.

A plurality of crossed pairs of secondary spokes 31 are positioned and arranged in tension intermediate the ring portion 11 and the hub portion 21. The outer ends of the spokes 31 have enlarged portions which are threaded as at 32 for the reception of ferrules 33, the ferrules being arranged in suitable spaced openings 34 in the portion 12 and extend radially inwardly to cover the threads 32 from view. As shown in Fig. 4, each of the ferrules is provided with an enlarged head portion 35 and a screw driver slot 36, for adjustment thereof. The inner ends of the spokes 31 are bent as at 37 so as to retain the spokes in suitable openings 38 in the hub portion 21.

The arrangement of the primary spokes 25 relative to the secondary spokes 31 is such that a radially divergent angle is formed therebetween so that upon tightening of the ferrule 33 on the threaded portion 32 of the spoke 31, the hub 11 will be moved slightly axially toward the ring 10 thus placing the spokes 25 in compression and therefore securely retaining these primary spokes intermediate the portions 13 and 22. Inspection of Figure 2 will reveal that the openings 30 in the ring portion 13, the openings 29 in the hub portion 22, and the openings 38 in the hub portion 21 all lie approximately in a cone shaped surface of revolution which generally coincides with the cone shaped portion 23 of the hub 11. This arrangement causes the compressive stresses in the primary spokes 25 and in the hub 11 to be transmitted substantially along straight lines from the ring portion 13 to the portion 21 of the hub 11 and there is thus little tendency for these compressive stresses to bend or distort the spokes 25 or the cone shaped portion 23 of the hub 11. It is therefore possible for these portions of the wheel cover which bear the compressive stresses to be made of light material. The secondary spokes 31 are fully capable of withstanding the tensile stresses to which they are subjected. The radial portion 15 of the outer ring 10 cooperates with the axial portions 12 and 13 of the ring 10 to make that ring quite rigid in spite of the fact that it is made of light gauge metal. The wheel cover thus formed is consequently rigid in construction, the hub 11 is maintained in proper concentric alignment with the ring 10 and the appearance of the unit is such as to simulate a wire or spoke type wheel and to have a pleasantly ornamental appearance.

A modified arrangement of the spokes of the present device is shown in Figs. 5 and 6 wherein like parts are indicated by a single primed reference numeral. In this modification the spokes 25' are straight in construction and are adapted to be seated in openings 29' and 30' in the ring 10' and the hub 11' respectively. These openings are formed in extruded bosses 40 and 41 formed from the portions 13' and 22' respectively. In this modification, bosses 42 are also formed from the portion 12' of the ring 10' for the reception of the heads of the ferrules 33'.

As shown in Fig. 7, the reduced diameter portions 28' of the primary spokes 25' may be riveted over as at 43 in order to provide a more rigid construction. However it has been found that this arrangement, while occasionally desirable, is not always necessary.

In Fig. 8, a further modification of the invention is shown wherein like parts are indicated by double primed reference numerals. In this modification, the spoke 25" is formed from a tube 44 through which a rivet 45 extends. The rivet is formed with the usual head 46 and the other end 47 thereof may be riveted over in use.

In Figs. 9 and 10 I show a still further modification of the invention as directed to a modified form of secondary spoke members and their attachment means to the wheel cover. As shown, these modified secondary spokes, as indicated generally at 50, comprise an elongated bolt member 51 having a head 52 and a threaded portion 53. A sleeve 54 is adapted to be placed over the bolt 51 and extend intermediate the portions 12 and 21 of the outer ring and hub respectively. A nut 55 threadably engages the threaded portion 53 and is adapted to secure the spoke in position. This modified arrangement enables a novel construction of the wheel cover in such a manner as to provide a modified form of tension means intermediate the portions 12 and 21 to thereby place the primary spoke means 25 in compression.

From the foregoing description, the uses, advantages, and operation of my invention will be readily understood by those skilled in the art to which the invention appertains. While I have described certain embodiments of my invention, I desire to emphasize the fact that the invention may be applied to various types of wheel covers, to have it understood that the examples given are merely illustrative, and that the invention is not to be limited to the details disclosed herein, but is to be accorded the full scope of the appended claim.

I claim:

A wheel cover comprising an outer ring having radially spaced inner and outer concentric ring portions connected by a generally radial portion, a hub having radially spaced inner and outer concentric hub portions connected by a generally cone shaped hub portion, a plurality of primary spokes connecting said outer hub portion to said inner ring portion, and a plurality of secondary spokes connecting said inner hub portion to said outer ring portion, said secondary spokes forming an outwardly diverging angle with said primary spokes, the points of attachment of said primary spokes to said inner ring portion and to said outer hub portion and the points of attachment of said secondary spokes to said inner hub portion all lying substantially in a cone shaped surface of revolution which generally coincides with said cone shaped hub portion, said secondary spokes being in tension and said primary spokes being under compression, whereby compressive stresses in said wheel cover are transmitted along substantially straight lines from said inner ring portion to said inner hub portion.

References Cited in the file of this patent

UNITED STATES PATENTS

| 662,594 | Esty | Nov. 27, 1900 |
| 1,418,331 | Schenck et al. | June 6, 1922 |
| 1,433,435 | Van Horn | Oct. 24, 1922 |
| 1,910,164 | Horn | May 23, 1933 |

FOREIGN PATENTS

| 714,587 | France | Sept. 7, 1931 |